J. S. KING.
MEASURING DEVICE.
APPLICATION FILED MAR. 6, 1912.
1,049,108.
Patented Dec. 31, 1912.
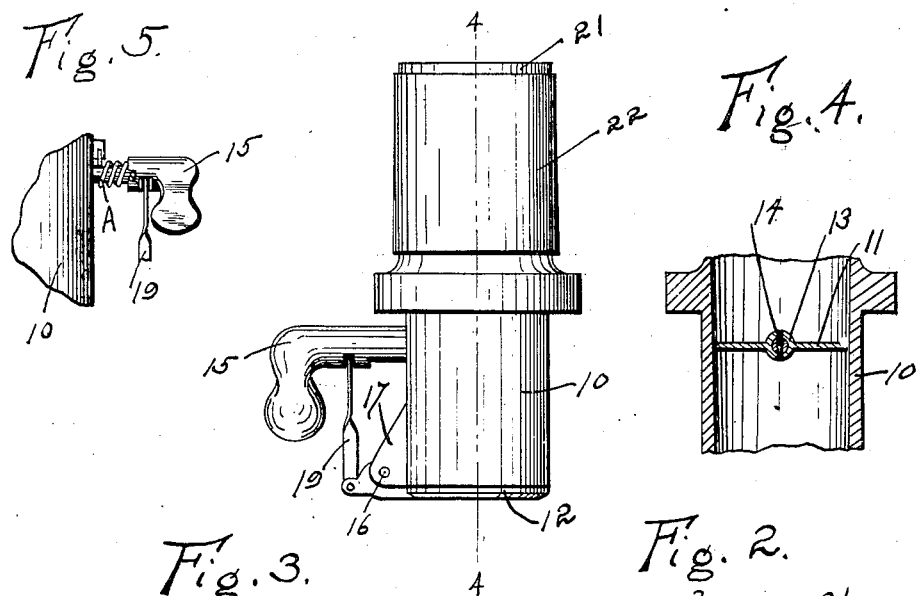
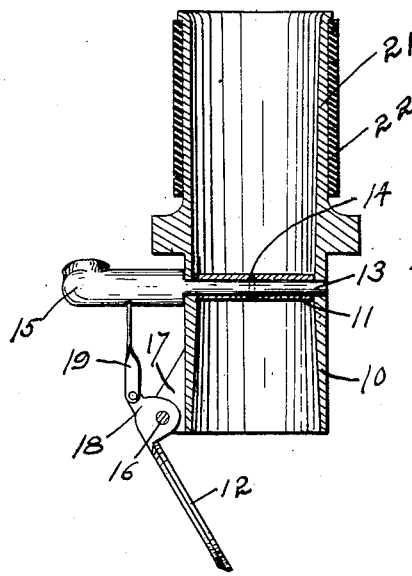
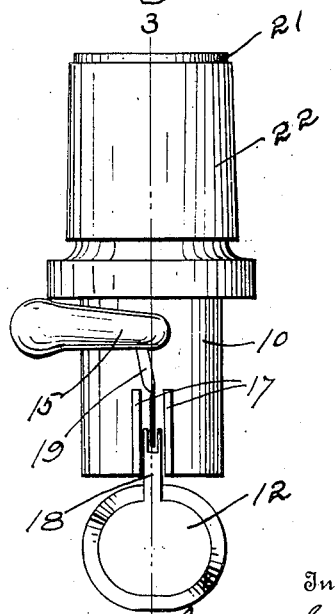

UNITED STATES PATENT OFFICE.

JOSEPH S. KING, OF BALTIMORE, MARYLAND, ASSIGNOR OF ONE-HALF TO WILLIAM A. MATTHEWS, OF BALTIMORE, MARYLAND.

MEASURING DEVICE.

1,049,108. Specification of Letters Patent. Patented Dec. 31, 1912.

Application filed March 6, 1912. Serial No. 681,906.

*To all whom it may concern:*

Be it known that I, JOSEPH S. KING, a citizen of the United States of America, and resident of Baltimore city, in the State of Maryland, have invented certain new and useful Improvements in Measuring Devices, of which the following is a specification.

This invention relates to measuring devices, particularly to means designed primarily for use as attachments for bottles containing granular material which is to be dispensed therefrom in predetermined quantities, as for instance head-ache remedies and other medicines and materials usually dispensed at drug stores and other places where a predetermined amount is allowed for each portion or drink served at a soda water fountain or the like.

An object of this invention is to provide novel means for measuring and discharging successively the contents of a bottle or container, the said invention being designed to operate in such a way as to prevent accumulation or lodgment of material within the measuring device, the said invention serving to agitate the material to a sufficient extent as to cause it to be dislodged and to pass from the measuring receptacle.

A still further object of this invention is to provide a measuring device which is manually operated to open and deliver the material, means being provided for automatically closing the same for repetition of the operation.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a front elevation of a measuring device embodying the invention; Fig. 2 illustrates a side elevation of the same; Fig. 3 illustrates a section taken on the line 3—3 of Fig. 2; Fig. 4 illustrates a section taken on line 4—4 of Fig. 1; Fig. 5 illustrates a detail view of a portion of the device slightly modified; and Fig. 6 illustrates a detail view of a link for connecting the crank handle with a lower trap.

In these drawings, 10 denotes a casing, or chute with which the traps 11 and 12 are associated, the said trap 11 being in the form of a valve mounted on a shaft 13 and secured thereto by any suitable device such as a cross pin 14. The shaft 13 is journaled in the casing and terminates in a crank handle 15 having its end weighted to hold it normally depressed, the said trap 11 being so positioned, when the handle is in its depressed position that it stands vertically, or approximately vertically, in the casing to permit material to pass thereby into the casing, the said material being held by the door or trap 12 which normally closes the lower end of the casing when the trap 11 stands vertically therein.

The trap 12 is mounted on a pivot 16 supported by the ears 17 preferably formed integral with the casing, the said trap 12 having a tail piece or lug 18 to which a link 19 is pivoted, the said link extending to and being connected to the operating crank handle 15 by the pin 20 which is eccentric to the shaft so that as the crank handle is moved to partially rotate the shaft on which it is secured or of which it forms a part, motion is communicated to the trap 12 through the link and to the trap 11 through the shaft.

As will be observed, the parts are so organized that the traps are alternately in position to guard the opening through the casing so that while the trap 12 is opened to discharge the material, the trap 11 lies across the channel in the casing and prevents material from passing beyond the trap 11.

The casing 10 has a nipple 21 which is designed to enter the neck of a bottle or container from which material is to be dispensed and said nipple is preferably provided with a gasket 22 which insures the proper fitting of the nipple in the bottle so that the same may be practically air-tight and liquid proof.

As shown in the modification, Fig. 5, instead of having the crank handle provided with a weighted end, I may provide a spring A which bears against a portion of the mechanism for forcing the trap at the end of the casing into closed position, and since the other trap is operatively connected thereto, the said traps are made to oppositely move into and out of position to guard the opening to the casing. The provision of the spring for holding the traps closed prevents movement of the said traps which might otherwise occur in the event of the container being manipulated or moved from an upright to an inverted position, or vice versa.

In Fig. 6 I have shown a detail view of the link 19, one end of which is shown as having a longitudinally disposed slot B which receives the pin in the crank arm and allows the pin to move a predetermined distance before communicating motion to the link. This relation of parts provides for a lag or rest of the lower trap while the trap to which the crank handle is connected is being moved to close the passage through the casing and it is a desirable feature, for the reason that it prevents direct communication between the nipple portion of the casing and the measuring portion thereof prior to the time the end of the casing is closed by the trap 12, and this arrangement prevents the discharge of material from the container directly through the casing without its being measured.

It will be understood that I do not wish to be limited with respect to the exact details of construction or the particular use to which this invention is applicable, as it has been found in practice that I may utilize it for measuring of comparatively minute quantities and that it is likewise useful for measuring comparatively large quantities of groceries, merchandise and the like; furthermore I wish it understood that the measuring device may consist of metal, although where the same is to be used in measuring chemicals or merchandise which will have a tendency to corrode metal, the casing and parts associated therewith which come in contact with chemicals injurious to metal, may be constructed of glass or other composition. It will also be observed that the interior of the casing is flared toward its outer end, which construction will prevent clogging of the apparatus while in use.

I claim:

1. In a measuring device, a casing having a passage therethrough and having means of connection with a container, a shaft extending through the casing intermediate its length, a trap on said shaft, a weighted crank handle on the shaft, a pivot on the crank handle eccentric to the shaft, a link having a longitudinally disposed slot near one end to receive the pivot, a second trap for guarding said passage, means of connection between the link and the last mentioned trap whereby the movement of the link actuated by the crank handle is communicated to the last mentioned trap for opening and closing the same in alternation with the closing and opening respectively of the trap intermediate the length of the casing.

2. In a measuring device, a casing having means of connection with a container, a trap intermediate the length of the casing, means for supporting and partially rotating the said trap including a handle outside of the casing, said handle being provided with means for normally holding the handle in one position, a trap near the end of the casing, means for mounting the last mentioned trap on the casing, a link connected to and operating the last mentioned trap, said link having a slot longitudinally disposed near its end remote from the last mentioned trap, a pivot carried by the handle and movable in the slot to permit movement of the last mentioned trap a predetermined degree independently of the movement communicated to the second mentioned trap through the operation of the link.

In testimony whereof, I affix my signature in the presence of two witnesses.

JOSEPH S. KING.

Witnesses:
 GEO. R. JARMAN,
 G. J. SIMPSON.